United States Patent Office 3,509,376
Patented Apr. 28, 1970

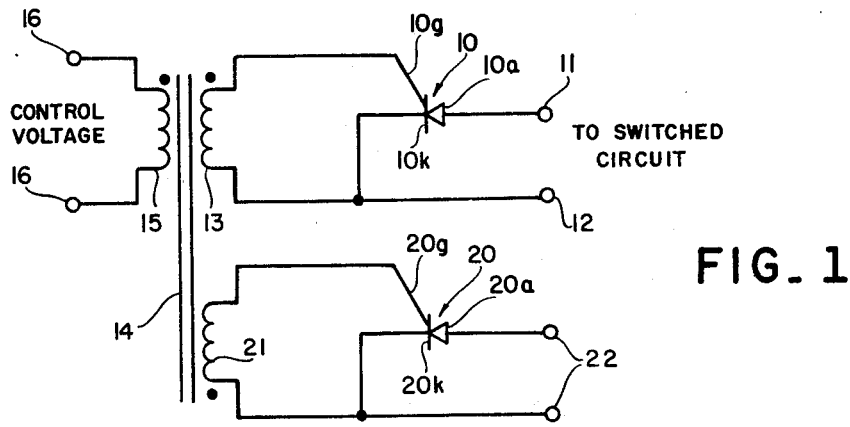
FIG. 1
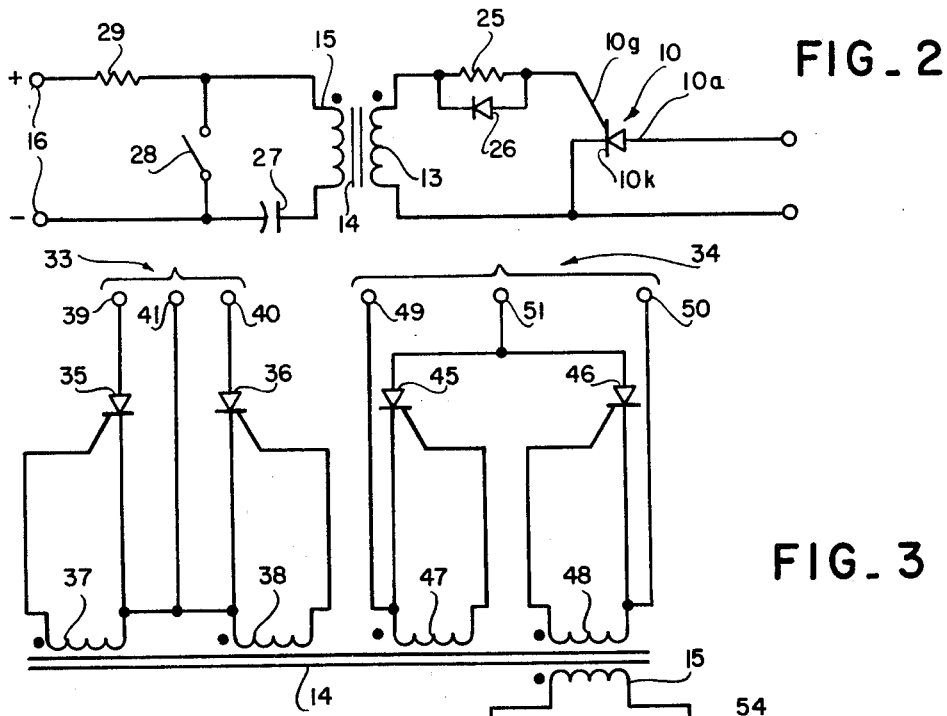
FIG. 2
FIG. 3
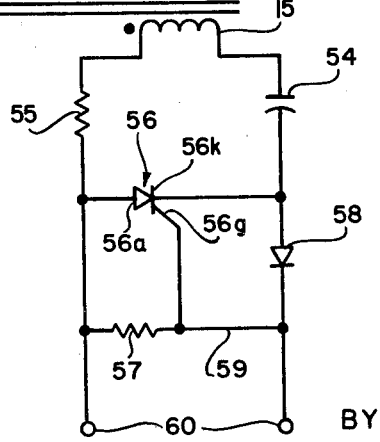
INVENTOR.
PHILIP W. KOETSCH
BY George C. Sullivan
Agent

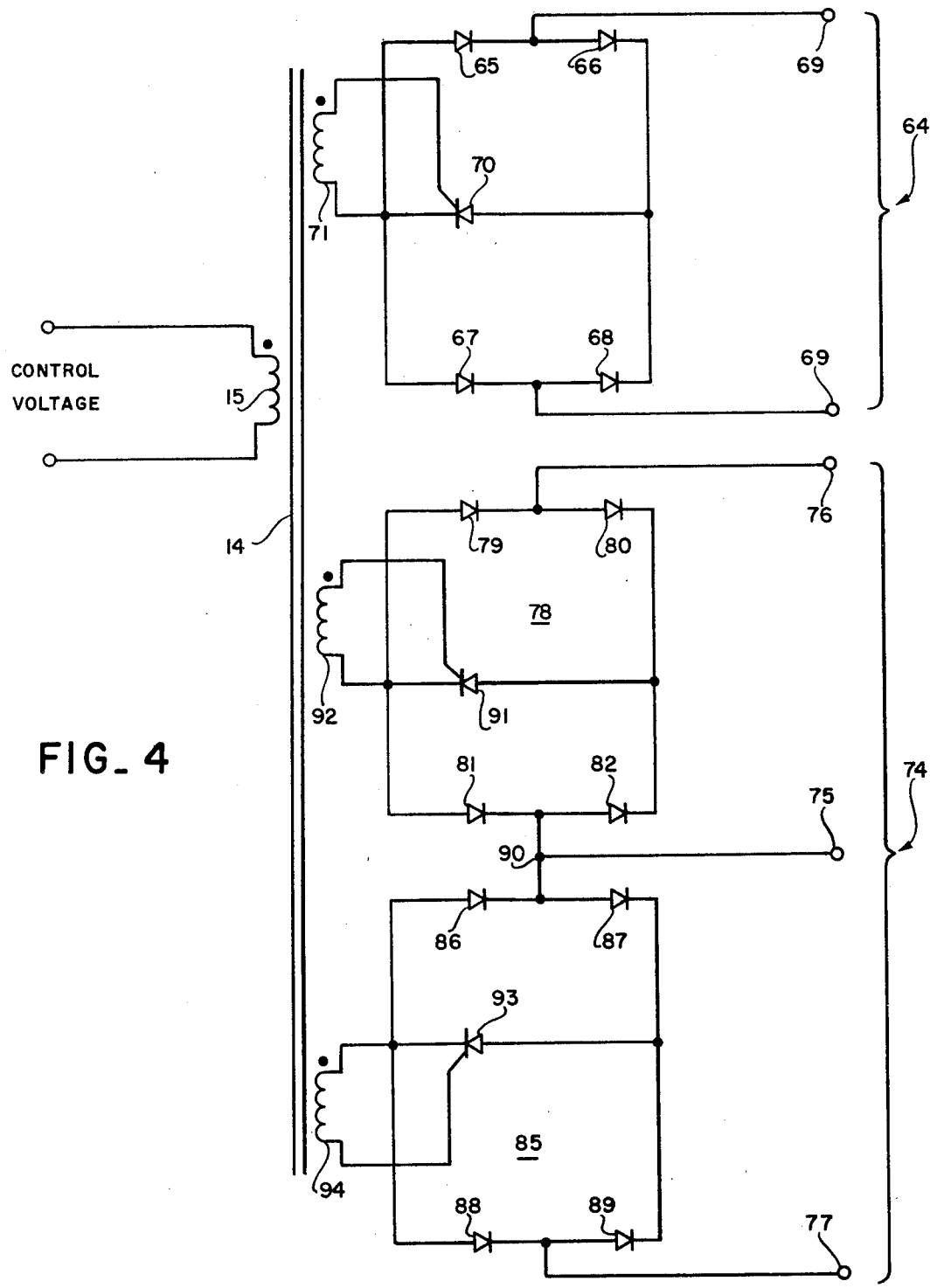

3,509,376
STATIC SOLID-STATE SWITCHING CIRCUIT
UTILIZING A SWITCHING DEVICE HAVING
TURN-ON AND TURN-OFF CONTROL
Philip W. Koetsch, Mableton, Ga., assignor to Lockheed
Aircraft Corporation, Burbank, Calif.
Filed July 22, 1965, Ser. No. 474,051
Int. Cl. H03k 17/72
U.S. Cl. 307—252
5 Claims

ABSTRACT OF THE DISCLOSURE

A gate turn-off control rectifier is used to provide switching circuits which electrically isolate the switched circuit from the switching control circuit and which require no electromechanical components such as relays. Switching circuits are disclosed for use either with AC or DC circuits. Additionally shown are switching circuits having single-pole, single-throw characteristics. Switching pulse circuits are disclosed which provide switching control pulses of selected polarity with the opening or closing of a control switch.

---

This invention relates in general to switching devices and in particular to switching devices using static or solid-state components and which permit the circuit being switched to be electrically isolated from the switching control circuit.

In circuit design there frequently arises the need for a switching device which functions to open or close one or more electrical circuits and which may be controlled at a point remote from the location of the actual switching apparatus. An example of such a switching device is the electromagnetic relay, which is well known to those skilled in the art and which generally comprises one or more electromagnetic coils and an armature member which is attractable to these coils and which may be resiliently biased to a position away from the coils. Connected to the armature are one or more electrical contact members which function to open or close appropriate circuits when the armature is attracted to or biased from the control coils. Operating voltage may be applied to th coil or coils from a control point remotely located from the actual relay.

While a switching device of the type described above works satisfactorily for many applications, such a switching device also has a number of known disadvantages. For example, circuits carrying any substantial amount of current will produce arcing at the relay contacts as these contacts are opened and closed. This arcing tends to cause deterioration of the contacts and ultimate failure of the relay. Furthermore, relays of this type using a movable armature are susceptible to vibration and acceleration and thus are not always usable in such environments. The fact that an armature having substantial mass and inertia must be moved to perform a switching operation also contributes to the relative slowness of operation of such relays.

A prior art switching technique which overcomes many of the objects of the electromagnetic relay involves the use of transistors as switching elements; however, transistors require continuous application of control current to maintain the transistor in a conducting or nonconducting state, depending on the type of transistor used, whereas relays can readily be designed to latch into a conducting or nonconducting position through the application of only a pulse of control current. This means that a transistor used as a switching element cannot be electrically isolated from the control circuit inasmuch as the use of a transformer in the control circuit would block passage of the steady control signal required of the transistor.

Still another type of prior art switching device is the thyratron tube and its solid-state analogy, the silicon controlled rectifier. When an anode-cathode voltage of the proper polarity is placed across such devices, the device may be driven into a conductive state by the application of a voltage pulse to the control element—the grid, in the case of the thyraton tube, and the gate, in the case of the silicon controlled rectifier. Once driven into conduction the device continues to conduct notwithstanding the absence of any voltage on the control electrode, and conduction continues until voltage permitting conduction is no longer present across the device or until the circuit is broken at some other point. This points out the major failing of such devices as the thyraton tube and the silicon controlled rectifier as switching elements, inasmuch as such devices are capable only of turning on an electrical circuit and lack the capability of turning off a circuit.

Many of the problems associated with the switching devices of the prior art have been overcome or minimized according to the present invention whereby there is provided a static switching circuit capable of being turned on and turned off with appropriate current pulses and which also may be controlled, if desired, in a manner similar to that of the conventional electromagnetic relay wherein application of a steady-state control voltage to the switching circuit causes switching action to occur and removal of this control voltage causes the switching circuit to revert to its original state.

Accordingly, an object of this invention is to provide an improved switching circuit.

Another object of this invention is to provide an improved solid-state switching circuit.

Yet another object of this invention is to provide a switching circuit having no moving components.

Still another object of this invention is to provide a solid-state switching circuit wherein the circuit being controlled can be turned off without the necessity of auxiliary circuit opening apparatus in the controlled circuit.

A further object of this invention is to provide a solid-state switching circuit readily capable of being electrically isolated from the controlling circuit.

A still further object of this invention is to provide a solid-state switching circuit utilizing a gate turn-off controlled rectifier.

The exact nature of this invention as well as other objects and advantages thereof will be readily apparent from consideration of the following specification relating to the annexed drawing in which:

FIGURE 1 shows a switching circuit according to an embodiment of this invention;

FIGURE 2 shows a switching circuit forming a modification of the embodiment shown in FIGURE 1 and additionally shows an embodiment of a control circuit used with and forming a part of this invention;

FIGURE 3 shows a pair of circuits for a double-throw switching circuit according to another embodiment of this invention in addition to showing another embodiment of control circuit therefor; and FIGURE 4 shows a circuit representing yet another embodiment of this invention intended for switching alternating current.

Stated generally, the embodiments of the invention described herein utilize a gate turn-off controlled rectifier in combination with a transformer to supply the necessary control pulses to the gate turn-off controlled rectifier while permitting isolation of the rectifier anode-cathode circuit from the source of control pulses and from other portions of the apparatus in which the switching circuit is embodied. According to the embodiments described, the switching device of this invention can be set up to provide single-pole switches of the normally open or normally closed variety, as well as single-pole double-throw switches. Alternating current as well as direct current switching circuits may be provided according to the teachings of this invention, and plural switching circuits may be disposed so as to be simultaneously switched by a single control pulse.

More specifically and with reference to the drawing, there is shown in FIGURE 1 thereof a basic embodiment of a switching circuit according to this invention. This embodiment includes a gate turn-off controlled rectifier 10 having an anode 10a, a cathode 10k, and a gate electrode 10g. The anode and cathode of gate turn-off controlled rectifier 10 are connected through terminals 11 and 12 with a circuit to be switched, while gate electrode 10g is connected to the secondary winding 13 of pulse transformer 14. The primary winding 15 of pulse transformer 14 is connected through terminals 16 to a suitable source of control voltage as explained below.

The gate turn-off controlled rectifier exhibits properties generally similar to those of the conventional silicon controlled rectifier in that when the anode of the gate turn-off controlled rectifier is made positive with respect to the cathode thereof and then a positive current pulse of appropriate magnitude is supplied to the gate electrode of the gate turn-off controlled rectifier, the rectifier is rendered substantially conductive to permit current flow from the anode to the cathode and through the circuit in which the anode and cathode are connected. As mentioned above, however, once current flow is initiated in a silicon controlled rectifier, this current flow continues until the current flow is interrupted at some other point in the circuit. The operation of the gate turn-off controlled rectifier differs from that of the conventional silicon controlled rectifier in that once conduction has been initiated through the gate turn-off controlled rectifier, this conduction can be terminated and the rectifier once again rendered substantially nonconductive by the application of a suitable negative current pulse to the gate electrode thereof.

It can be seen that if terminals 11 and 12 are connected in series to an appropriate circuit to be switched and if a pulse of current of the proper polarity is applied to control voltage terminals 16, there will be produced at gate electrode 10g a current pulse which will render rectifier 10 substantially conductive. Rectifier 10 will remain in this conductive state notwithstanding the removal of control voltage from terminals 16 and the resulting absence of control current in gate electrode 10g. The switching device comprised by rectifier 10 thus remains in the conductive state until another current pulse, having a polarity opposite that of the current pulse initiating conduction, is applied to terminals 16. This second applied current pulse causes to be produced at gate electrode 10g a negative current pulse which turns off rectifier 10 and effectively opens the circuit connected to terminals 11 and 12. As is apparent, the switch comprised by rectifier 10 is completely isolated from the control circuitry comprised by primary winding 15 and terminals 16 because of the interposition of pulse transformer 14.

Any number of completely isolated switching elements of the type set forth herein may be provided so long as there is on the pulse transformer 14 a separate secondary winding for each switching circuit which is to be isolated from the primary or control circuit and from other switching circuits. By way of example, in FIGURE 1 there is shown a second switched circuit comprising gate turn-off controlled rectified 20 having anode 20a, cathode 20k, and gate electrode 20g with the gate electrode connected to an additional secondary winding 21 and with terminals 22 connected to the anode and cathode of rectifier 20. The polarity of secondary winding 21 is opposite that of secondary winding 13 such that for a control pulse of a given polarity as applied to primary winding 15 the polarity of the current pulse applied to to gate electrode 10g is opposite that of the current pulse applied to gate electrode 20g. Thus, the application of a single current pulse to primary winding 15 serves to open one of the circuits switched by a first gate turn-off controlled rectifier at the same time that a second circuit being switched by the other gate controlled turn-off rectifier is being closed. This is analogous to the situation where the contacts of a conventional electromagnetic relay are connected so that one pair of contacts is normally open (NO) while another pair of contacts is normally closed (NC).

Of course, it is apparent that any number of secondary windings may be employed to control a like number of switching circuits using gate turn-off controlled rectifiers. These secondary windings may either by contained in a single pulse transformer or, alternatively, may be provided by a number of pulse transformers whose primary windings are connected together in an appropriate manner. Of course, if isolation of the switched circuits from each other is neither essential nor desired, then a given secondary winding may be used to control more than one rectifier.

Turning to FIGURE 2 of the drawing, there is shown in the secondary circuit thereof a modification of the embodiment of the switching circuit set forth in FIGURE 1. In this circuit there has been added in the gate electrode portion thereof a resistance 25 and a diode 26 connected in shunt across that resistance. When control pulse circuits of a particular variety, as described more fully below, are used which result in an oscillatory circuit being present in the primary side of the transformer 14, sudden discharge of the capacitance of the oscillatory circuit can cause ringing or oscillation of the control current in the gate portion of the secondary circuit. Some types of gate turn-off controlled rectifiers exhibit the operational characteristic that substantially more current is required to turn off the rectifier than is required for turn-on, and so ringing current pulses of the magnitude required for turn-off may produce false turn-on of the rectifier 23. To avoid this possibility diode 26 is disposed in series with the gate circuit of rectifier 23, the polarity of diode 26 being chosen to permit passage of turn-off current and to block passage of turn-on current. Resistance 25 connected in shunt across diode 26 is chosen to cause damping of the ringing current without permitting passage of sufficient current to cause false turn-on; when turn-on of rectifier 10 is desired, a current pulse of sufficient magnitude is supplied to meet the relatively low turn-on requirement notwithstanding resistance 25.

Turning to the primary portion of the circuit shown in FIGURE 2, there is set forth an embodiment of a circuit which may be used to provide appropriate control current pulses for the switching circuits of this invention. Such a control pulse producing circuit desirably should permit the switching circuit to be controlled in the same manner as a conventional electromagnetic relay, with closure of a control switch causing the switching circuit to assume a first state and opening of the switching causing the switching circuit to assume a second state.

A simple and inexpensive circuit for producing this control function is shown in FIGURE 2, wherein primary winding 15 is connected in series with capacitance 27 and resistance 29 to a source of relatively constant input potential through terminals 16. Control switch 28 is connected in shunt across primary winding 15 and capacitance 17. With switch 28 in the open position, application of control voltage to terminals 16 causes capacitance 27 to become charged through primary winding 15. Resistance 29 serves to limit current flow. Passage of charging current for capacitance 27 through primary winding 15 causes to be induced in secondary winding 13 a current pulse which functions to provide the appropriate switching current for rectifier 10. As capacitance 27 becomes fully charged, the current in primary winding 15 is reduced substantially to zero, and the output from secondary winding 13 correspondingly drops to zero. This condition maintains until switch 28 is closed, whereupon capacitance 27 suddenly discharges through primary winding 15 to produce in this winding current flow having a direction opposite to the flow of current required to charge capacitance 27. This discharge current causes to be produced in secondary winding 13 a current pulse of polarity opposite from that induced by the charging current for the capacitance, whereupon rectifier 10 is caused to be switched to a state opposite that produced by the charging current for capacitance 27. This second condition maintains until such time as switch 28 is again placed in an open condition, whereupon capacitance 27 once again commences to charge and the switching cycle is repeated.

The embodiments of switching circuit set forth in FIGURE 1 and FIGURE 2 have been of the single-throw variety, wherein N switching circuits can be combined to yield an N-pole single-throw switch. In FIGURE 3 there are shown two embodiments of an N-pole double-throw static switching circuit according to this invention. Inasmuch as these embodiments require that each of the gate turn-off controlled rectifiers used have a given element connected in common as explained below, the first embodiment, shown generally at 33, is used where the common pole of the double-throw switching circuit is of negative polarity while the second embodiment, shown generally at 34, is used where this common pole is of positive polarity.

Turning to first embodiment 33, there is shown a pair of gate turn-off controlled rectifiers 35 and 36 connected to a respective pair of secondary windings 37 and 38. The anode of rectifier 35 is connected to terminal 39 and the anode of rectifier 36 is connected to terminal 40, while the cathodes of rectifiers 35 and 36 are connected together to common terminal 41. A similar arrangement is present in the second embodiment 34, wherein first and second gate turn-off controlled rectifiers 45 and 46 are connected respectively to first and secondary windings 47 and 48. The cathode of rectifier 45 is connected to terminal 49, the cathode of rectifier 46 is connected to terminal 50, and the anodes of the two rectifiers 45 and 46 are connected together in common to terminal 51.

It should be noted that in the circuits of each of embodiments 33 and 34 the gate electrodes of the two rectifiers are connected in opposite polarity such that, for example, as rectifier 35 is being rendered conductive by a given primary current pulse, rectifier 36 is being rendered nonconductive; and, similarly, while rectifier 45, for example, is being rendered conductive by a given primary pulse, rectifier 46 is being rendered nonconductive by this same pulse. This means that for a given pulse of control current in the primary 15 of transformer 14, the conduction path of the circuit of embodiment 33 is switched, for example, from terminals 40–41 to terminals 39–41; while the conduction path of the circuit of embodiment 34 similarly is switched, by way of example, from terminals 51–50 to terminals 51–49.

As set forth above, any number of such double-throw switching circuits may be provided to produce an N-pole double-throw switching circuit, where N represents the number of single-pole double-throw switching circuits present. So long as individual secondary windings are used, each of the N poles switched will be electrically isolated from the other poles and from the primary circuit.

Also shown in FIGURE 3 is a control pulse producing circuit which may be used alternatively to the control circuit shown in FIGURE 2. The control circuit shown in FIGURE 3 eliminates the need for a source of current continuously connected to the primary circuit. This control circuit includes capacitance 54 and current limiting resistance 55 connected in series with primary winding 15. Connected in shunt across the series including resistance 55, capacitance 54 and winding 15 is a switching circuit including silicon controlled rectifier 56. The anode 56a of silicon controlled rectifier 56 is connected to a switched source of positive potential through one of terminals 60, while the cathode 56k of rectifier 56 is connected through diode 58 to a negative terminal of this source at the other of terminals 60. Resistance 57 is connected between anode 56a and gate electrode 56g. The gate electrode 56g also is connected as by lead 59 to the source of negative potential, thereby effectively shunting diode 58 with respect to the gate electrode.

In the operation of this pulse producing circuit, it is assumed that terminals 60 are connected to a power source in series with a suitable switch which is actuated to cause operation of the switching circuits of this invention as contained in the secondary circuits of transformer 14. Closure of this switch applies a potential of the indicated polarity across terminals 60 and accordingly causes charging of capacitance 54 through resistance 55 and primary winding 15. Silicon controlled rectifier 56 remains nonconductive at this time, inasmuch as gate 56g and cathode 56k are substantially at the same potential. Passage of charging current through primary winding 15 induces the requisite switching pulses in the secondary windings of transformer 14. As capacitance 54 becomes charged, current flow through primary winding 15 approaches zero, even though the potential applied to terminals 60 remains.

When it is desired to cause the switching circuits as contained, for example, in embodiments 33 and 34 to revert to their initial state, potential is removed from terminals 60 whereupon the charge stored in capacitance 54 commences to leak off through a discharge path including primary winding 15, resistance 55, resistance 57 and the gate-cathode circuit of rectifier 56. This leakage current through the gate circuit of rectifier 56 causes this rectifier to be placed in the conductive state, whereupon the charge stored in capacitance 54 suddenly discharges through rectifier 56 to produce a pulse of current in primary winding 15 and a corresponding pulse of current in each of the secondary windings of transformer 14. Diode 58 ensures that the leakage discharge of capacitance 54 must flow through the gate circuit of silicon controlled rectifier 56.

It will be understood, of course, that the foregoing circuits for producing control pulses are by way of example only, and that any technique may be used in connection with the switching circuits of this invention so long as the requisite current pulses are furnished thereby.

The switching circuits set forth in the preceding embodiments are useful only in direct current switching applications, inasmuch as the use of such circuits with alternating current would permit conduction through the circuit for only one half cycle at the most. The embodiments of this invention set forth in FIGURE 4 of the drawing are directed to a static solid-state switching circuit useful in either direct current or alternating current applications.

In the first embodiment, shown generally at 64, of the AC switching circuit, set forth in FIGURE 4, there is included a bridge type rectifier comprising diodes 65, 66, 67 and 68. The AC voltage to be switched is supplied through terminals 69 to one side of the bridge, and a gate turn-off controlled rectifier 70 is connected across the opposite side of the bridge. The circuitry of the gate turn-off controlled rectifier 70 is completed in the manner set forth above, with secondary winding 71 of transformer 14 being connected between the gate and the cathode of rectifier 70. Control current pulses from a suitable source, such as either of those described above, are applied to primary winding 15 of pulse transformer 14.

In the operation of the embodiment shown generally at 64 an alternating input signal applied across terminals 69 is rectified and applied to gate turn-off controlled rectifier 70 so that the cathode of rectifier 70 always remains negative with respect to the anode of this rectifier. In this manner conduction through rectifier 70 is maintained notwithstanding the change in polarity of the input signal.

The second embodiment of an AC static solid-state switching circuit, shown generally at 74 in FIGURE 4, is of the single-pole double-throw type, with a common pole connected to terminal 75 and with two switched poles connected respectively to terminals 76 and 77. Embodiment 74 basically comprises a pair of switching circuits of the type set forth above as embodiment 64. These switches include a first rectifier bridge 78 comprising diodes 79, 80, 81 and 82, and a second rectifier bridge 85 comprising diodes 86, 87, 88 and 89. Each of bridges 78 and 85 has a side connected in common at point 90; the opposite side of bridge 78 is connected to terminal 76 while the opposite side of bridge 85 is connected to terminal 77.

Connected across the sides of bridge 78 opposite the input to that bridge is a gate turn-off controlled rectifier 91 connected in the above-described manner to secondary winding 92, while connected across the sides of bridge 85 opposite the input thereto is a second gate turn-off controlled rectifier 93 connected to a secondary winding 94. As in the double-throw circuits shown in FIGURE 3 hereof, secondary windings 92 and 94 are connected to the gate electrode of their respective rectifiers in opposed polarity so that an input pulse of a given polarity as applied to primary winding 15 causes rectifier 91, for example, to be placed in the conductive state while at the same time causing rectifier 93 to be placed in the nonconducting state.

Each of the rectifier bridges 78 and 85 functions substantially as set forth above with regard to the function of the embodiment shown generally at 64. Thus, when rectifier 91 is in a conductive state and rectifier 93 is in a nonconductive state, a conductive circuit is established through rectifier bridge 78 between terminals 75 and 76, while no conduction takes place through bridge 85. When the position of the double-throw switching circuit is reversed, with rectifier 91 becoming nonconductive and rectifier 93 becoming conductive, conduction then is established through rectifier bridge 85 between contacts 75 and 77 while bridge 78 is rendered nonconductive.

It will be understood as set forth above in the embodiments of FIGURES 1 through 3 that any number of switching circuits according to embodiments 64 and 74 may be provided so as to produce multi-pole AC solid-state static switching circuits. The secondary windings required to drive these switching circuits similarly may be contained on a single transformer or may be contained on a number of transformers supplied with common drive pulses. Although the embodiments set forth in FIGURE 4 have been described as AC switching circuits, these circuits are also usable in DC switching applications.

From the foregoing it can be seen that there has been disclosed and described a number of embodiments of a static solid-state switching circuit which uses rectifier elements to provide both turn-on and turn-off capabilities and which provides complete electrical isolation between the contacts of the switched circuits, as well as between the control circuit and the switched circuits. Having no moving parts, the switching circuits according to this invention are faster of operation and more reliable than mechanical relays, and these circuits are not adversely affected by vibration or acceleration. Suitable control circuits have also been disclosed and described which permit operation of these switching circuits in a manner similar to that of a conventional electromagnetic relay, wherein voltage is applied to perform a switching function and this voltage subsequently may be removed to cause the switching function to revert to its initial state.

It should be understood, of course, that the foregoing relates to only preferred embodiments of the invention and that numerous modifications or alterations may be made therein without departing from the spirit and the scope of the invention as set forth in the appended claims.

I claim:

1. An electrical switching apparatus having a pair of terminals for electrical connection to a circuit to be switched, comprising in combination:
   a gate turn-off controlled rectifier having an anode, a cathode, and a gate electrode,
   said anode being electrically connected to one terminal and said cathode being electrically connected to the other terminal of the pair of terminals;
   control signal transformer means having a primary winding and a secondary winding;
   said secondary winding operatively connected to said gate electrode;
   a capacitance connected in series with said primary winding; and
   a control switch connected in parallel with the series circuit comprised by said primary winding and said capacitance at terminal points connectable to a source of control electricity;
   so that current from the source of control electricity flows in a first direction in said primary winding to induce a secondary winding signal of a first polarity and to charge said capacitance when said control switch is open, and so that the charge stored in said capacitance is discharged by flowing in said primary winding in a second direction opposite to said first direction to induce a secondary winding signal of a second polarity opposite to said first polarity when said control switch is closed.

2. A circuit as in claim 1, wherein:
   said control switch comprises a controlled rectifier having an anode connected to receive potential of positive polarity from said source of control electricity and a cathode connected in series with the anode of a diode means which has a cathode connected to receive potential of negative polarity from said source of control electricity;
   the gate electrode of said controlled rectifier being connected in series with a resistance to one side of said series circuit comprised by said primary winding means and said capacitance means; and
   said gate electrode additionally being connected to the cathode of said diode means.

3. Electrical switching apparatus as in claim 1 for switching a circuit including alternating current, comprising in combination:
   a first pair of diodes, in which the anode of one diode is connected to the cathode of the other diode;
   a second pair of diodes, in which the anode of one diode is connected to the cathode of the other diode;
   the anodes of each of said other diodes being connected in common with the cathode of said turn-off controlled rectifier;
   the cathodes of each of said one diodes being connected in common with the anode of said turn-off controlled rectifier;
   circuit means connecting the anode to cathode connection of said first pair of diodes with one of the pair of terminals for connection to an alternating-current circuit to be switched; and
   additional circuit means connecting the anode to cathode connection of said second pair of diodes with the other of such pair of terminals.

4. An electrical switching apparatus having a common terminal which is electrically switchable to either of two other terminals which are connectable to a circuit to be switched, comprising in combination:
   a first gate turn-off controlled rectifier;
   a second gate turn-off controlled rectifier;
   each of said gate turn-off controlled rectifiers having an anode as a first rectifier element, a cathode as a second rectifier element, and a gate electrode;
   control signal transformer means having a primary winding and two secondary windings;

a capacitance in series with said primary winding;

the series circuit comprised by said primary winding and said capacitance being connected in parallel with a control switch at terminal points for applying a source of control electricity;

a common one of said rectifier elements of each said turn-off controlled rectifier being connected together and in electrical connection with the common terminal;

each of the other of said rectifier elements being separately in electrical connection with the two other terminals;

one of said secondary windings being operatively connected to the gate electrode of one of said turn-off controlled rectifiers with the polarity of said one secondary winding selected to produce at such gate electrode a signal of predetermined polarity in response to a signal of a certain polarity flowing in said primary winding; and the other of said secondary windings being operatively connected to the gate electrode of the other of said turn-off controlled rectifiers with a polarity selected to produce at such gate electrode a signal polarity opposite to said predetermined polarity in response to said primary winding signal of said certain polarity.

5. A pulse producing circuit capable of causing charging of a capacitance upon application to the circuit of a voltage and discharge of the capacitance upon removal from the circuit of the voltage, comprising:

circuit means including a capacitance;

controlled rectifier means connected in shunt across said circuit means;

said controlled rectifier means having anode means connected to a source of voltage such that a positive potential is selectively present at said anode means;

said controlled rectifier means having cathode means connected in series with a diode means to said source of voltage such that a negative potential is selectively present at said cathode means;

said controlled rectifier means having gate electrode means connected in series with a resistance to said anode means; and said gate electrode means additionally being connected in shunt across said diode means such that when potential is applied across said anode and cathode means and across said circuit means current flows through said circuit means in a first direction to cause charging of said capacitance and when the potential is removed said controlled rectifier means is rendered substantially conductive to enable discharge current from said capacitance to flow through said circuit means in a second direction opposite to said first direction.

References Cited
UNITED STATES PATENTS

| | | | |
|---|---|---|---|
| 2,722,649 | 11/1955 | Immel et al. | 307—252 |
| 2,920,240 | 1/1960 | Macklem | 307—252 |
| 3,127,522 | 3/1964 | Thorndyke | 307—253 |
| 3,196,329 | 7/1965 | Cook | 307—252 |
| 3,299,297 | 1/1967 | Motto | 307—252 |
| 3,348,073 | 10/1967 | Oudard | 307—252 |
| 3,273,046 | 9/1966 | Bedford | 307—252 |
| 3,290,486 | 12/1966 | Mordwinkin | 307—252 |
| 3,309,527 | 3/1967 | Walker | 307—252 |
| 3,313,957 | 4/1967 | Fischman | 331—111 |

JOHN S. HEYMAN, Primary Examiner

H. A. DIXON, Assistant Examiner

U.S. Cl. X.R.

307—246